United States Patent Office 3,053,621
Patented Sept. 11, 1962

3,053,621
PRODUCTION OF STANNOUS HALIDE
David Horvitz, Cheverly, Md., assignor to National Distillers and Chemical Corporation, New York, N.Y., a corporation of Virginia
No Drawing. Filed June 4, 1958, Ser. No. 739,685
6 Claims. (Cl. 23—98)

This invention relates to a new process for the production of stannous halide. More particularly, the invention pertains to a method wherein stannous halides are obtained from the reduction of stannic halides.

It is known in the art that stannic halides may be reduced by hydrogen to stannous halides. This method has the disadvantage of requiring high temperatures; and, in addition, results in the formation of metallic tin as an undesirable by-product. The development of an effective and economic process for the conversion of stannic halide to lower valent halides is particularly important in certain processes which depend upon the reducing power of stannous halides. In such processes the stannous halide is converted to stannic halide and, in order to provide an economic process, the latter must be reconverted to the stannous form as inexpensively as possible and with minimum loss of active tin compounds due to reduction of such compounds to metallic tin.

An example of a process utilizing a stannous halide, e.g. stannous chloride, is the production of hydroxylamine by the reduction of nitric acid, nitric oxides, nitrates or nitrites. More specifically, nitric acid is added in concentrated form to a strong aqueous solution of stannous chloride to form hydroxylamine. The stannic chloride which was formed during the reaction is selectively extracted from the product mixture by use of an ether or ester solvent, and then recovered either by extraction with water or by evaporating the solvent therefrom. This process has hereto not been commercially attractive because of the losses resulting from the conversion of stannic chloride to metallic tin rather than to stannous chloride when employing the prior art processes.

This invention has as an object a novel process for the preparation of stannous halides. Another object is to provide a process for the production of stannous halides from stannic halides which avoids the difficulties encountered in the prior art processes. A further object is to provide a process for the preparation of stannous halides which can be readily handled on a commercial scale. Other objects will become apparent from the ensuing description of the invention.

In accordance with the present invention, these objects are accomplished by the following process which comprises reducing stannic halides with hydrogen in the presence of a catalyst, selected from the group consisting of platinum and palladium. The use of platinum is especially preferred, since this catalyst results in outstanding yields of the stannous halides.

Though the invention will be described hereinafter with particular reference to the preparation of stannous chloride, it will be understood that stannous bromides and iodides may also be similarly prepared.

In general, the inventive process is carried out in a rather simple manner. The reaction vessel is charged with stannic chloride, a solvent therefor, and the platinum or palladium catalyst. Hydrogen is then passed into the reaction vessel, and the resulting stannous chloride recovered after a reaction period ranging from about 1 to 24 hours, the time for completion depending on the pressure employed. Water is the preferred solvent, though other known solvents such as alcohols and ethers may also be employed. The amount of solvent utilized is not critical; and, generally, the weight ratio of solvent to stannic chloride may range from about 1:1.5 to 20:1. It will be understood, however, that higher or lower concentrations of stannic chloride in the solvent may also be effectively employed in the process of this invention.

In some instances it has been found to be advantageous to initially add some hydrochloric acid, or analogous mineral acids if stannous bromides or iodides are being prepared, to the reaction mixture. The reduction process can, however, be carried out with no acid added initially, free acid being produced as a by-product as the reaction proceeds. Thus, the process is operable with initial acid concentration ranging from zero up to about 10 Normal.

The reduction of stannic halides in the presence of a platinum or palladium catalyst will take place at atmospheric pressures. However, the reduction at atmospheric pressure is rather slow; and, in accordance with another feature of this invention, it is preferred to operate at pressures within the range of about 50 to 2000 p.s.i. Higher pressures may also be employed, but they do not appear to cause a significant improvement. The operating temperatures may vary from close to the freezing point of the solution up to about 100° C. It is preferred, however, to employ ambient temperatures or, more specifically, temperatures of about 10° to 50° C.

The catalysts useful for the purposes of this invention may be employed as such or supported on conventional inert material such as carbon, barium sulfate, alumina, silica gel, etc.

The following examples will illustrate the nature of the invention. There is, however, no intention to limit the invention to these examples.

*Example I*

To a solution containing 26.3 grams of $SnCl_4 \cdot 5H_2O$ and 8.4 mls. of concentrated hydrochloric acid in 100 mls. of water there was added 1 gram of 10% platinum on carbon catalyst. Hydrogen was introduced at 70 p.s.i. At the end of 24 hours the conversion to stannous chloride was 99.6% complete.

*Example II*

To a solution of 105 grams of $SnCl_4 \cdot 5H_2O$ in 21.5 mls. of water was added 8.4 mls. of concentrated hydrochloric acid and 1 gram of 10% palladium on carbon catalyst. Hydrogen at a pressure of 70 p.s.i. was introduced, and after 16 hours the conversion to stannous chloride was 7.2%.

*Example III*

To 210 mls. of water in a round bottom flask equipped with a stirrer there was added 35 grams of $SnCl_4 \cdot 5H_2O$ and 1 gram of 10% platinum on carbon catalyst. Hydrogen was introduced at atmospheric pressure. At the end of 9 hours the conversion to stannous chloride was found to be 12.8%. During the course of this reaction the temperature was maintained successively at ambient temperature, at 0° C. and at 40° C. for 3 hour periods, respectively. No appreciable difference in rate of hydrogen absorption was noted at the separate temperature levels.

*Example IV*

Hydrogen under a pressure of 72 p.s.i was introduced into a vessel containing 35 grams of $SnCl_4 \cdot 5H_2O$ in 210 mls. of water and 1 gram of 10% platinum on carbon catalyst. The temperature was maintained at 30°–35° C. A conversion to stannous chloride of 54.5% was found at the end of 12 hours.

*Example V*

To a solution of 105 grams of $SnCl_4 \cdot 5H_2O$ in 21.5 mls. of water there was added 8.4 mls. of concentrated hydrochloric acid and 1 gram of 10% platinum on carbon catalyst. Hydrogen was introduced at 70 p.s.i. At the end of 23 hours the conversion to stannous chloride was 45.6%.

The above data show stannous chloride can be readily prepared by reducing stannic chloride with hydrogen in the presence of a platinum or palladium catalyst. The preferred use of platinum as the catalyst and elevated pressure is also demonstrated. No tin was produced in any of these reactions.

While this invention has been described and illustrated by the above examples, it is not intended to be strictly limited thereto and other modifications and variations may be employed within the scope of the following claims.

What is claimed is:

1. A process for the preparation of stannous halide selected from the group consisting of stannous chloride, stannous bromide, and stannous iodide which comprises reacting stannic halide selected from the group consisting of stannic chloride, stannic bromide, and stannic iodide with hydrogen in the presence of a catalyst selected from the group consisting of platinum and palladium at a temperature ranging from the freezing point of the solution up to about 100° C. and in the presence of a solvent for the stannic halide.

2. The process of claim 1 wherein said catalyst is platinum.

3. The process of claim 1 wherein said reaction is carried out at a pressure of about 50 to 2000 p.s.i.

4. A process for the preparation of stannous chloride which comprises dissolving stannic chloride in water, adding a catalyst selected from the group consisting of platinum and palladium to said solution, introducing hydrogen into the resulting reaction mixture at a pressure within the range of about 50 to 2000 p.s.i. and at a temperature ranging from the freezing point of the solution up to about 100° C. to reduce said stannic chloride to stannous chloride.

5. The process of claim 4 wherein the weight ratio of water to stannic chloride is in the range of about 1:1.5 to 20:1.

6. The process of claim 4 wherein said catalyst is platinum.

References Cited in the file of this patent

UNITED STATES PATENTS

| | | |
|---|---|---|
| 1,164,141 | Sulzberger | Dec. 14, 1915 |
| 1,426,517 | Sulzberger | Aug. 22, 1922 |
| 2,357,429 | Saxer et al. | Sept. 5, 1944 |
| 2,375,506 | Turck | May 8, 1945 |
| 2,582,885 | Rosenblatt | Jan. 15, 1952 |

FOREIGN PATENTS

| | | |
|---|---|---|
| 261,922 | Germany | July 3, 1913 |